United States Patent
Hino et al.

(10) Patent No.: US 12,008,356 B2
(45) Date of Patent: Jun. 11, 2024

(54) MULTIPLE COMMUNICATION PROTOCOL COEXISTENCE

(71) Applicant: Honda Motor Co., Ltd., Tokyo (JP)

(72) Inventors: Shumpei Hino, Wako (JP); Dylan M. Kunkel, Dublin, OH (US); Yasumasa Kaitani, Dublin, OH (US); Blake J. Dansfield, Dublin, OH (US); Alexander P. Bakalas, Marysville, OH (US); Sanath Javagal, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 17/687,100

(22) Filed: Mar. 4, 2022

(65) Prior Publication Data

US 2023/0280995 A1  Sep. 7, 2023

(51) Int. Cl.
*G06F 8/65* (2018.01)
*H04L 12/40* (2006.01)
(Continued)

(52) U.S. Cl.
CPC ........... *G06F 8/65* (2013.01); *H04L 12/40* (2013.01); *H04L 67/34* (2013.01); *H04L 2012/40215* (2013.01); *H04L 67/12* (2013.01)

(58) Field of Classification Search
CPC . G06F 8/65; G06F 8/658; H04L 12/40; H04L 67/34; H04L 67/12; H04L 2012/40215
See application file for complete search history.

(56) References Cited

U.S. PATENT DOCUMENTS 6,480,774 B1 * 11/2002 Snow ............... F16H 61/0213
  474/69
10,430,178 B2  10/2019 Mitchell et al.
(Continued)

FOREIGN PATENT DOCUMENTS

CN    108984194 A    12/2018
CN    111038413 A     4/2020
(Continued)

OTHER PUBLICATIONS

Lee Tae Hee; Translated KR 20210103054 A; 14 pages (Year: 2021).*
(Continued)

*Primary Examiner* — S. Sough
*Assistant Examiner* — Cuong V Luu
(74) *Attorney, Agent, or Firm* — Plumsea Law Group, LLC (57) ABSTRACT

A method and system of over the air (OTA) reprogramming of a systems of a vehicle performed by an OTA reprogramming device are provided. For example, the method includes determining whether a vehicle ignition is on or off. When the vehicle ignition is on, the method includes sending a classic controller area network (CAN) message comprising information to operate a transmission control unit (TCU), and using the classic CAN message to operate the TCU. When the vehicle ignition is off, the method includes sending a CAN flexible-data (FD) message comprising information to reprogram the TCU, and using the CAN FD message to reprogram the TCU. The method waits until an ignition of the vehicle is off to reprogram the TCU to avoid incompatibilities with a CAN FD message.

20 Claims, 7 Drawing Sheets

(51) Int. Cl.
    *H04L 67/00* (2022.01)
    *H04L 67/12* (2022.01)

(56) References Cited

U.S. PATENT DOCUMENTS

| | | |
|---|---|---|
| 2019/0248407 A1 | 8/2019 | Nakamura et al. |
| 2020/0358635 A1 | 11/2020 | Park et al. |
| 2020/0387368 A1 | 12/2020 | Jeong et al. |
| 2021/0001792 A1 | 1/2021 | Noda |
| 2021/0094491 A1 | 4/2021 | Yamashita |
| 2021/0109738 A1 | 4/2021 | Jung |
| 2021/0176090 A1* | 6/2021 | Yamamoto ............ B60R 16/023 |
| 2021/0320816 A1* | 10/2021 | Mutter .............. H04L 12/40032 |
| 2022/0014041 A1* | 1/2022 | Knode .................. H04W 72/20 |

FOREIGN PATENT DOCUMENTS

| | | | | |
|---|---|---|---|---|
| CN | 112104702 A | 12/2020 | | |
| JP | 2018115886 A | 7/2018 | | |
| JP | 2021024555 A | 2/2021 | | |
| KR | 20210103054 A | * | 8/2021 | ............... G06F 8/65 |

OTHER PUBLICATIONS

Parth Shendkar et al.; Attribute-based Access Control for Secure Firmware Over-The-Air Updates in Vehicles; IEEE; pp. 257-261; retrieved on Feb. 22, 2024 (Year: 2024).*

Ali Shoker et al.; ScalOTA: Scalable Secure Over-the-Air Software Updates for Vehicles; IEEE; pp. 151-161; retrieved on Feb. 22, 2024 (Year: 2023).*

* cited by examiner

MULTIPLE COMMUNICATION PROTOCOL COEXISTENCE

BACKGROUND

This disclosure relates generally to communication protocols, and in particular to communication protocols used to perform over the air (OTA) reprogramming of a transmission control unit (TCU).

It may be helpful to apply OTA reprogramming to a TCU of a vehicle, such as a 10AT transmission control unit (10AT TCU). Here, a 10AT refers to a ten-speed automatic transmission control unit. Such OTA reprogramming facilitates changing how the software controlling operation of the 10AT TCU works in a convenient manner.

There are number of issues with existing OTA reprogramming techniques that have yet to be addressed. For example, there may be a reprogramming time requirement for OTA which cannot be achieved by current methods for reprogramming a TCU, such as a 10AT TCU. However, while certain faster OTA protocols exist, they are not necessarily supported by all of the systems in a vehicle.

Accordingly, there is a need in the art for an improved way to manage OTA reprogramming in an environment where multiple communication protocols are used to manage systems that support different OTA reprogramming and operating protocols and have different timing requirements without causing errors.

SUMMARY

In one aspect, a method of over the air (OTA) reprogramming of systems of a vehicle performed by an OTA reprogramming device is provided. The method includes determining whether a vehicle ignition is on or off. The method also includes, when the vehicle ignition is on, sending a classic controller area network (CAN) message comprising information to operate a transmission control unit (TCU) and using the classic CAN message to operate the TCU. The method also includes, when the vehicle ignition is off, sending a CAN flexible-data (FD) message comprising information to reprogram the TCU and using the CAN FD message to reprogram the TCU.

In another aspect, an over the air (OTA) reprogramming method is provided. The method includes receiving an OTA request from an original equipment manager (OEM). The method further includes sending a controller area network (CAN) message based on the received OTA request across a CAN bus. When a vehicle ignition is on, the CAN message is a classic CAN message for operating a transmission control unit (TCU) connected to the CAN bus. When the vehicle ignition is off, the CAN message is a CAN flexible-data (FD) message for reprogramming the TCU connected to the CAN bus.

In another aspect, an over the air (OTA) reprogramming system of a vehicle is provided. The system includes an OTA manager, configured to receive an OTA request from an original equipment manager (OEM) and send a controller area network (CAN) message based on the received OTA request across a CAN bus. When a vehicle ignition is on, the CAN message is a classic CAN message and when the vehicle ignition is off, the CAN message is a CAN flexible-data (FD) message. The system further includes a transmission control unit (TCU) configured to receive the CAN message and use the CAN message to operate the TCU when the vehicle ignition is on and to use the CAN message to reprogram the TCU when the vehicle ignition is off.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a system and method are described herein that allow a user to successfully manage the coexistence of multiple control techniques when performing over the air (OTA) reprogramming, such as OTA reprogramming of embedded systems in a vehicle.

A goal of embodiments is to apply OTA reprogramming to a transmission control unit (TCU), in particular a 10-speed automatic transmission control unit (10AT TCU). However, there is a reprogramming time requirement for OTA reprogramming for such an 10AT that cannot be successfully achieved by using a current control method such as a classic controller area network (CAN) protocol.

It would be desirable to use a faster communication protocol, such as Controller Area Network Flexible Data-Rate (CAN FD) when reprogramming a TCU such as a 10AT TCU. However, in order to use CAN FD, all systems on the bus generally need to have a CAN FD hardware interface to avoid a communication error when CAN FD communication is executed. That is, even if some systems are compatible with CAN FD, errors occur when some systems are not compatible with the CAN FD protocol.

Thus, not all systems on the bus to which 10AT TCU is connected may have a CAN FD hardware interface. Thus, to address this issue, OTA reprogramming may be executed only after an ignition (IG) of a vehicle is off.

Embodiments presented in the following disclosure are presented in the context of OTA reprogramming of a 10-speed automatic transmission control unit (10AT TCU). However, embodiments are not limited to a 10AT TCU. One of ordinary skill would understand that other embodiments are possible that apply the disclosed approaches for OTA reprogramming for other types of transmission control units (TCUs) in a vehicle. Moreover, embodiments are not even limited to TCUs. The techniques for OTA reprogramming presented in this disclosure may be applied to other embedded systems in vehicles and other apparatuses in which OTA reprogramming of an embedded system is to be performed using CAN FD when the overall system is turned off and the overall vehicle or apparatus operates with classic CAN when the overall system is turned on.

CAN FD (Controller Area Network Flexible Data-Rate) is a data communication protocol typically used for broadcasting sensor data and control information on interconnections between different parts of electronic instruments and control systems. For example, this protocol is used in modern high performance vehicles. Such a use of the CAN FD protocol is discussed in greater detail throughout this disclosure.

CAN FD is an extension to the classic CAN bus protocol. CAN FD was developed to meet the need to increase the data transfer rate up to 5 times faster and with larger frame/message sizes for use in modern automotive Electronic Control Units (ECU)s. As in the classic CAN protocol, CAN FD protocol is designed to reliably transmit and receive sensor data, control commands and to detect data errors between electronic sensor devices, controllers, and microcontrollers.

A major difference between the classical CAN (Controller Area Network) and CAN FD is the use of Flexible Data (FD) technology. Using CAN FD technology, Electronic Control Unit (ECU)s are able to dynamically switch to different data-rate and with larger or smaller message sizes during communications. These approaches enhance CAN FD by providing the capability to dynamically select and switch to faster or slower data rate, as and when required. CAN FD also provides the ability to pack more data within the same CAN frame or message and transport it over the CAN infrastructure in less time.

Faster data speed and more data capacity enhancements results in several system operational advantages compared to the classic CAN. Using CAN FD, sensor and control data can be sent and received by the electronic control unit (ECU) software much more quickly. Accordingly, commands issued by the executing ECU software reach the output controller much more quickly, as well. CAN FD is typically used in high performance ECUs of modern vehicles.

An electronic control unit (ECU), also known as an electronic control module (ECM), is an embedded system in automotive electronics that controls one or more of the electrical systems or subsystems in a vehicle.

Types of ECU include an engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), a control unit, or a control module. Taken together, these systems are sometimes referred to as the vehicle's computer. However, technically there is no single computer but multiple ones. Embedded software in ECUs continues to increase in line count, complexity, and sophistication. Because the embedded software may need reprogramming, there is a need for OTA reprogramming, as discussed further throughout this disclosure.

At the core of an ECU is a microcontroller that processes information. The ECU may include memory of various sorts, as well as inputs, outputs, communication links, and embedded software.

A type of ECU that is of particular import in this disclosure is a transmission control unit (TCU), as discussed further, below.

A transmission control unit (TCU), also known as a transmission control module (TCM), or a gearbox control unit (GCU), is a type of automotive ECU that is used to control electronic automatic transmissions. Similar systems are used in conjunction with various semi-automatic transmissions, purely for clutch automation and actuation. A TCU in a modern automatic transmission generally uses sensors from the vehicle, as well as data provided by the engine control unit (ECU), to calculate how and when to change gears in the vehicle for optimum performance, fuel economy and shift quality.

The typical modern TCU uses signals from engine sensors, automatic transmission sensors and from other electronic controllers to determine when and how to shift gears. More modern designs of TCUs share inputs or obtain information from an input to the ECU, whereas older designs often have their own dedicated inputs and sensors on the engine components. Modern TCUs are so complex in their design and make calculations based on so many parameters that there are a huge amount of possible shift behaviors.

For example, inputs to a TCU may include a vehicle speed sensor (VSS), a wheel speed sensor (WSS), a throttle position sensor (TPS), a turbine speed sensor (TSS), a transmission fluid temperature sensor (TFT), a kick down switch, a brake light switch, a traction control system (TCS), switches, a cruise control module, or inputs from other controllers, as non-limiting examples.

The typical modern TCU also sends out signals to shift solenoids, pressure control solenoids, torque converter lockup solenoids and to other electronic controllers.

For example, outputs from a TCU may include a shaft lock, shifting solenoids, pressure control of solenoids, controlling of torque converter clutch solenoids (TCC), output to an ECU, and outputs to other controllers, as non-limiting examples.

Many TCUs provide an output to the ECU to retard the ignition timing, or reduce the fuel quantity, for a few milliseconds to reduce load on the transmission during heavy throttle. This approach by such TCUs allows automatic transmissions to shift smoothly even on engines with large amounts of torque which would otherwise result in a harder shift and possible damage to the gearbox.

The TCU may also provide information about the health of the transmission, such as clutch wear indicators and shift pressures, and can raise trouble codes and set the malfunction indicator lamp on the instrument cluster if a serious problem is found. An output to the cruise control module is also often present to deactivate the cruise control if a neutral gear is selected, just like on a manual transmission.

However, modern TCUs such as a 10AT TCU may require CAN FD when being reprogrammed to provide a sufficiently fast reprogramming operation.

In CAN FD, the frame/message ID uses the 29-bits format used in the Extended ID version of classic CAN, given that a Standard ID is only 11 bits long. The message payload size is increased to 64 bytes of data in each CAN frame or message, compared to only 8 bytes in the classic CAN frame. CAN FD is able to handle CAN frames or messages with an 11-bit ID as well.

A frame is a message transmitted as a sequence of binary bit patterns. In CAN FD, the data rate is increased to be 5 times faster than the classic CAN for the data payload, although the arbitration bit rate is still limited to 1 Mbit/s for compatibility. CAN FD protocol specification includes some other enhancements as well, such as better detection of errors. For example, CAN FD also decreases the number of undetected errors through increases in the performance of a cyclic redundancy check (CRC) algorithm.

Thus, CAN FD clearly offers many advantages over classic CAN. In particular, CAN FD provides the speed desired for reprogramming a 10AT TCU. Because OTA reprogramming is executed after an of a vehicle is off, the OTA only uses classic CAN messages when the car is operating but uses CAN FD for OTA reprogramming when the ignition is off. This approach avoids the occurrence of errors and achieves a desired OTA reprogramming time requirement.

Figure 1:
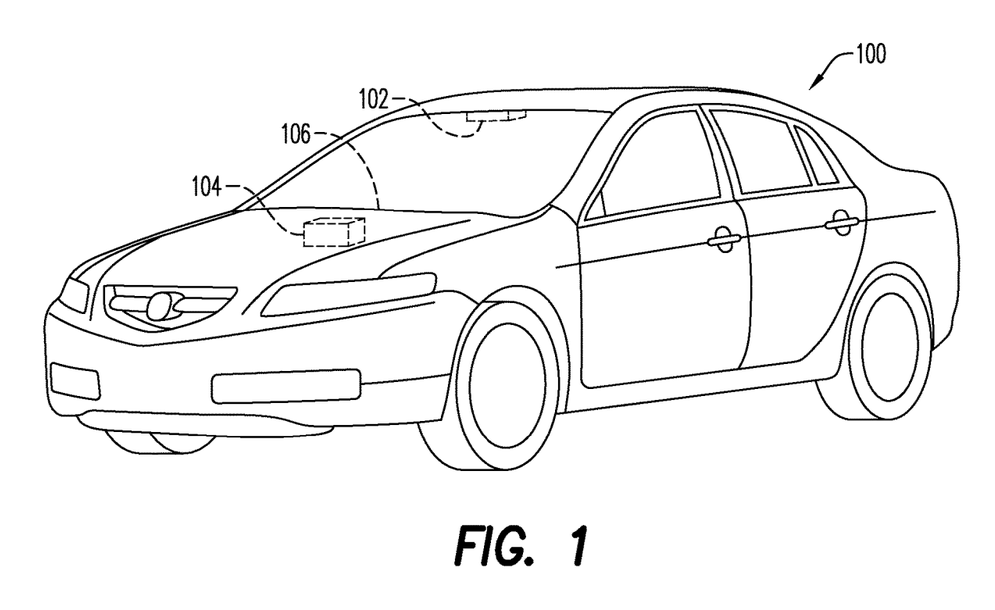
FIG. 1 is a representative view of the exterior of a vehicle, in accordance with aspects of the present disclosure.

FIG. 1 is a representative view of the exterior of a vehicle, in accordance with aspects of the present disclosure.

FIG. 1 is a schematic view of an illustrative embodiment of a motor vehicle 100. Motor vehicle 100 includes a communications system 102, a transmission control unit (TCU) 104, and vehicle systems 106.

Figure 6:
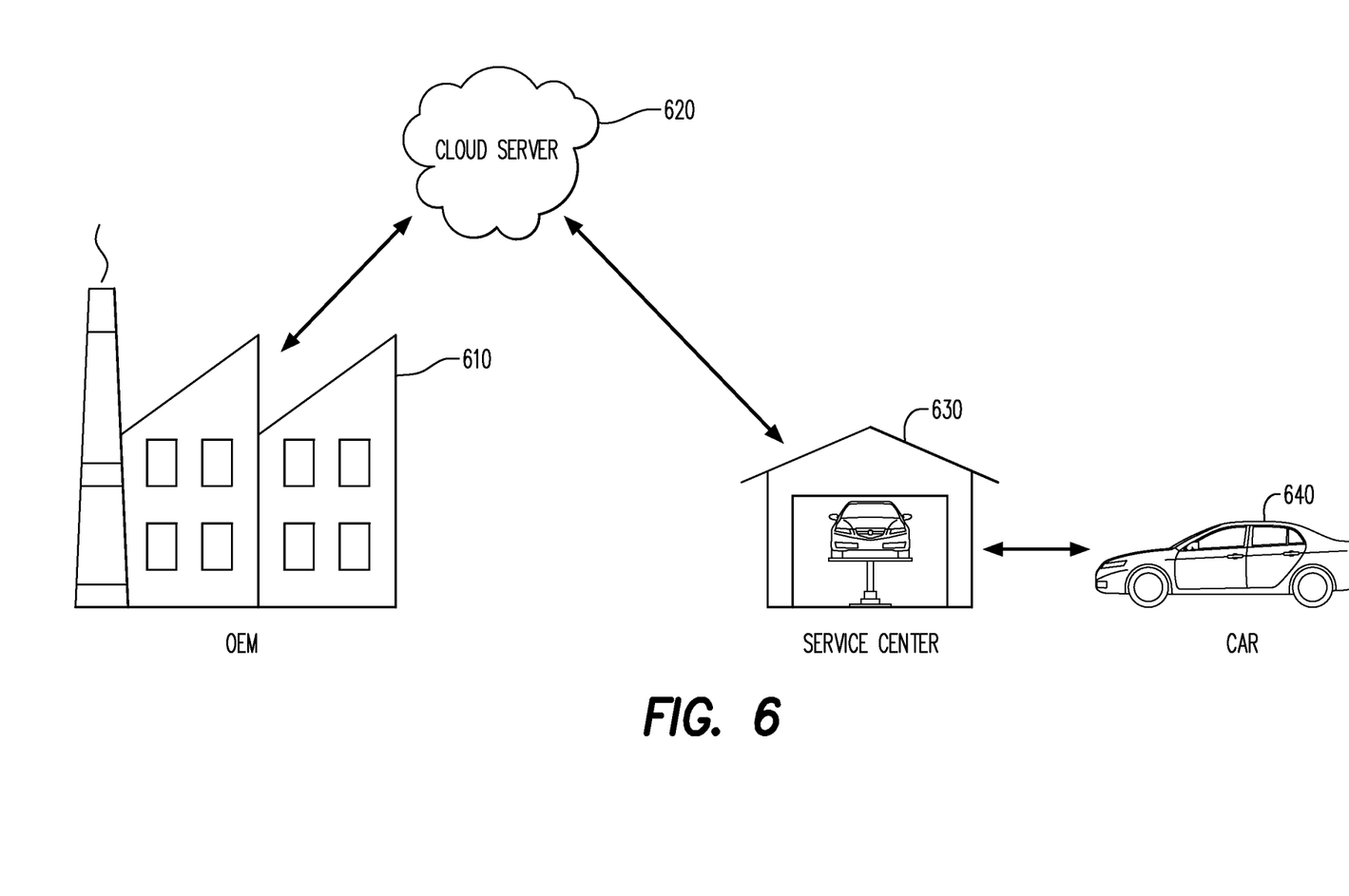
FIG. 6 is a diagram of information interchange. in accordance with aspects of the present disclosure.

Communications system 102 can be a device that assists in providing communications services to motor vehicle 100. Communications system 102 wirelessly connects motor vehicle 100 to an OTA reprogramming system, so it may involve data communications technologies such as a cellular telephone network, 3G networks, 4G LTE networks, 5G NR networks, and so on, as non-limiting examples. For example, communications system 102 may communicate with an original equipment manufacturer (OEM) as shown in FIG. 6 to receive information about software updates. The communications system 102 may also upload information in response to the software update information it receives, as necessary.

Once the communications system 102 receives reprogramming information, it uses it to reprogram TCU 104, which may be a 10AT TCU, as discussed further, below. The communications system 102 also uses the reprograming information to reprogram vehicle systems 106. Such reprogramming is explained in further detail, below.

Figure 2:
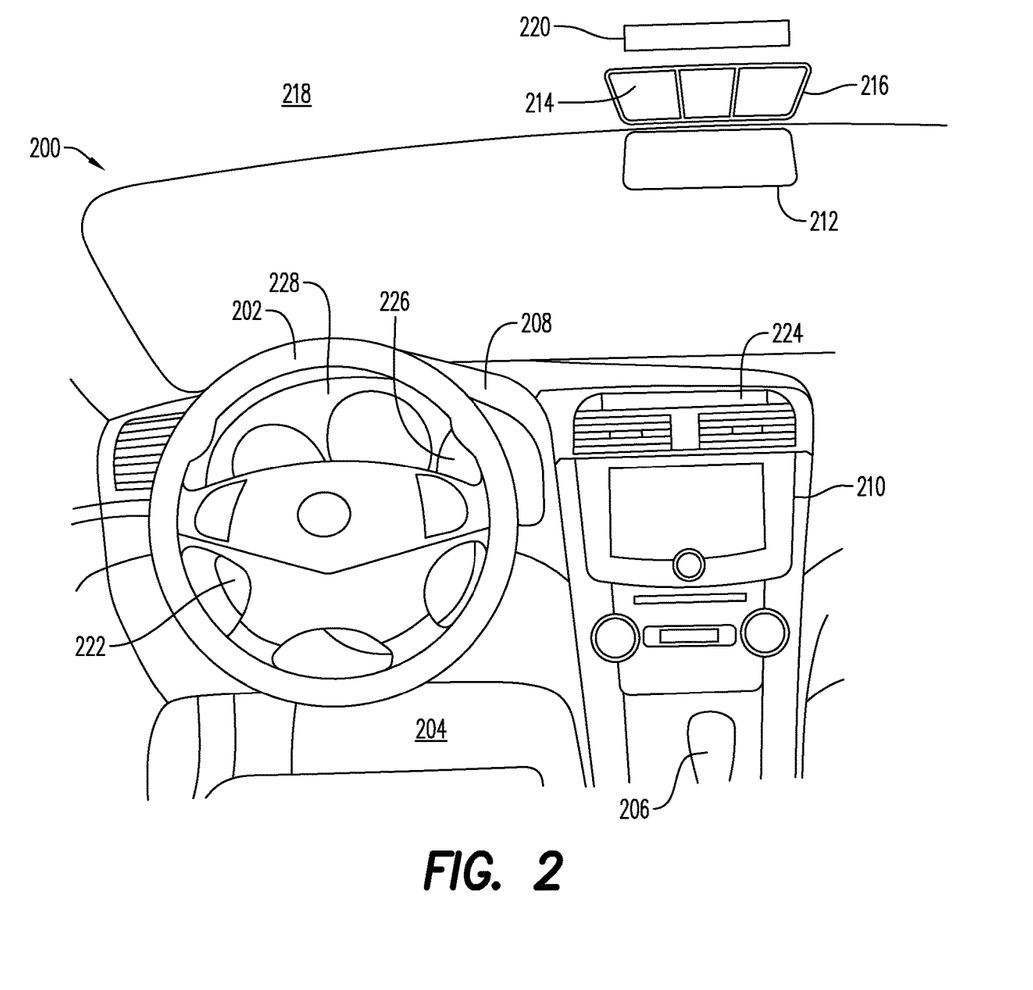
FIG. 2 is a representative view of the dashboard of a vehicle, in accordance with aspects of the present disclosure.

FIG. 2 is a representative view of the dashboard of a vehicle, in accordance with aspects of the present disclosure. FIG. 2 shows an embodiment of an interior 200 of the motor vehicle 100 of FIG. 1. Interior 200 includes a steering wheel 202, a driver's seat 204, a shifter or gear selector 206, a dashboard 208, a center console 210 and a rear view mirror 212. Preferably, interior 200 includes a Hands Free Telephone (HFT) unit 216 mounted in a headliner 218. Preferably, HFT unit 216 includes a microphone 214. In some embodiments, microphone 214 is also used with a navigation system.

Preferably, an HFT control unit 220 is mounted above headliner 218 so that it is out of plain sight. In some embodiments, HFT controls 222 are mounted onto steering wheel 202. Preferably, an HFT display unit 224 is disposed in center console 210. In addition, some embodiments include a multi-function display 226 disposed on dashboard 208. Multi-function display 226 can also show HFT information and status. In some embodiments, multi-function display 226 is disposed within instrument cluster 228 on dashboard 208.

The arrangement of the various components of the HFT system in the embodiment shown in FIG. 2 is intended to be ergonomically correct, and provide the user with an intuitive and easy to use HFT. The instrumentation in FIG. 2 allows a user to interact with the OTA reprogramming as necessary. For example, HFT system may show which parts of the vehicle are being reprogrammed and provide information such as a status indicator.

Figure 3:
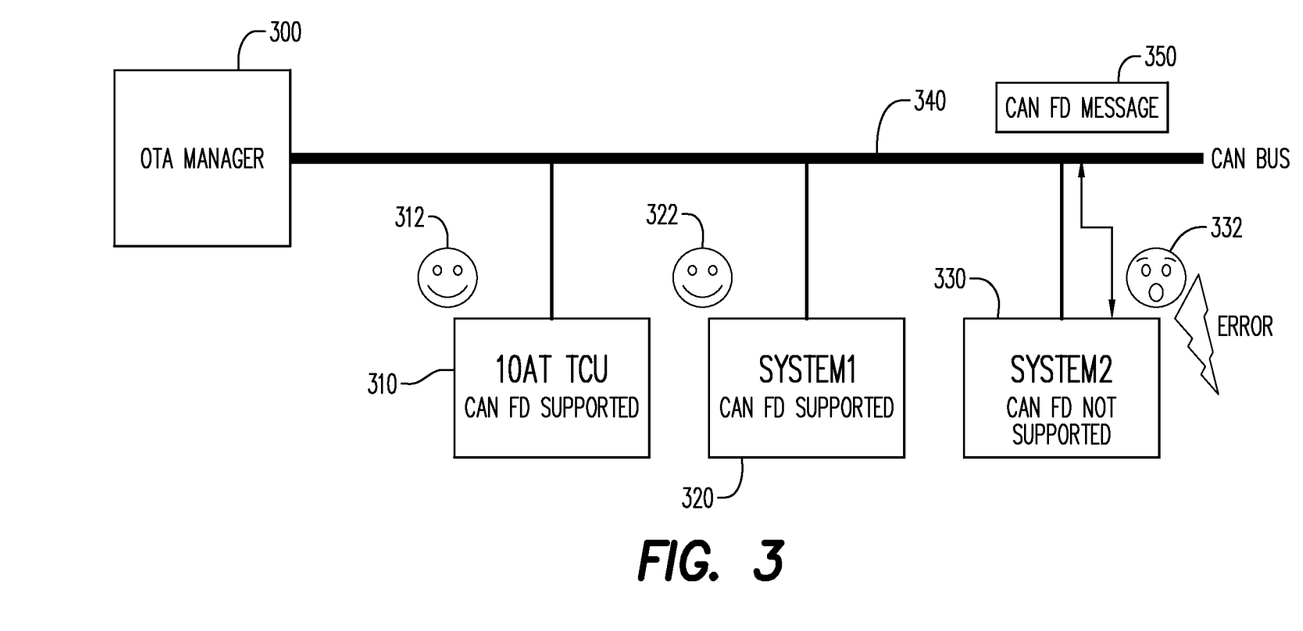
FIG. 3 is a diagram of an OTA manager used when reprogramming systems of a vehicle in which errors occur.

FIG. 3 is a diagram of an OTA manager used when reprogramming systems of a vehicle in which errors occur. For example, FIG. 3 includes OTA manager 300, which attempts to reprogram and operate a number of systems using a CAN FD message 350 sent along a CAN bus 340. For example, the OTA manager 300 may attempt to reprogram a 10AT TCU 310 and operate a system1 320, and a system2 330. In FIG. 3, the 10AT TCU 310 is OTA reprogrammed, while a system1 320 and a system2 330 are operated using a CAN FD message. However, while 10AT TCU 310 and system1 320 support CAN FD messages, system2 330 does not support CAN FD messages.

For example, in FIG. 3, the OTA manager sends a CAN FD message to 10AT TCU 310, a system1 320, and a system2 330. 10AT TCU 310 supports CAN FD messages. Thus, when 10AT TCU 310 receives a CAN FD message, the reprogramming is successful, as shown by indicator 312. In the example shown in FIG. 3, system1 320 also supports CAN FD messages. Thus, when system1 320 receives a CAN FD message, the operation of system1 320 is successful, as shown by indicator 322. However, system2 330 does not support CAN FD messages. Thus, when the CAN FD message 350 sent along CAN bus 340 is received by system2 330, the operation of system2 330 is not successful, as shown by indicator 332 in that system2 330 does not support CAN FD messages, only classic CAN messages. Hence, an error occurs, possibly interfering with normal operation of the vehicle.

Figure 4:
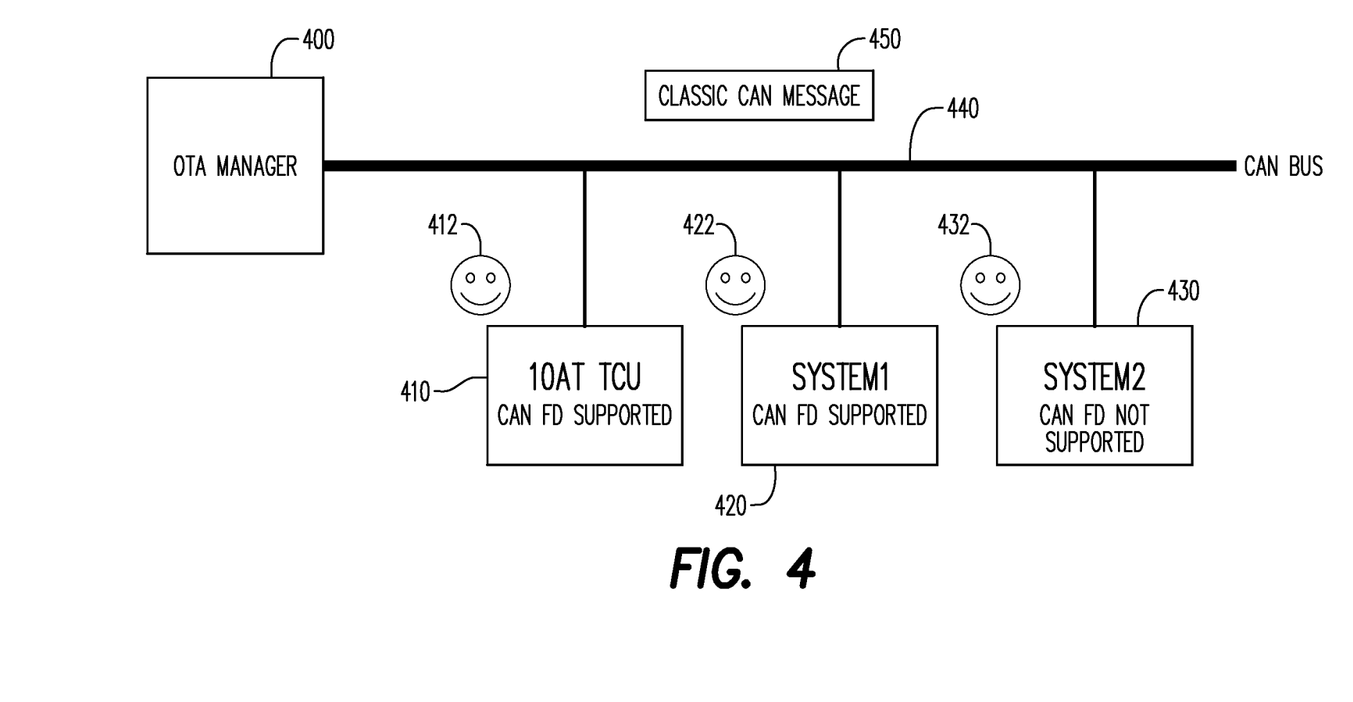
FIG. 4 is a diagram of an OTA manager used when operating systems of a vehicle, when an ignition of a vehicle is on, in accordance with aspects of the present disclosure.

FIG. 4 is a diagram of an OTA manager when operating systems of a vehicle, when an ignition of a vehicle is on, in accordance with aspects of the present disclosure. Aspects of FIG. 4 are somewhat similar to those of FIG. 3. For example, FIG. 4 includes OTA manager 400, which attempts to operate a number of systems using a classic CAN message 450 sent along a CAN bus 440. For example, the OTA manager 400 may attempt to operate a 10AT TCU 410, a system1 420, and a system2 430. In FIG. 4, the 10AT TCU 410 is operated using a classic CAN message 450. While 10AT TCU 410 and system1 420 support CAN FD messages, system2 430 does not support CAN FD messages. However, while system2 430 does not support CAN FD messages, it does not present a problem. The message sent along CAN bus 440 is a classic CAN message 450, and hence system2 430 supports the classic CAN message 450.

Thus, when an OTA manager 400 operates with an ignition that is on, the operation of 10AT TCU 410 is successful, as shown by indicator 412. The operation of a system1 420 is also successful, as shown by indicator 422, and the operation of a system2 430 is also successful, as shown by indicator 432.

The operation in FIG. 4 uses a classic CAN message 450. Thus, the operation lacks some of the advantages of using CAN FD messages. However, the disadvantages of not using CAN FD messages are outweighed by the advantages of guaranteeing that even if some systems that need to be compatible with classic CAN messages are present, all systems will successfully operate. Such an approach is especially important when the ignition is on because it may be important to guarantee that it is possible to operate all vehicle systems to avoid a communication error or another error that could jeopardize safe operation of the vehicle.

Figure 5:
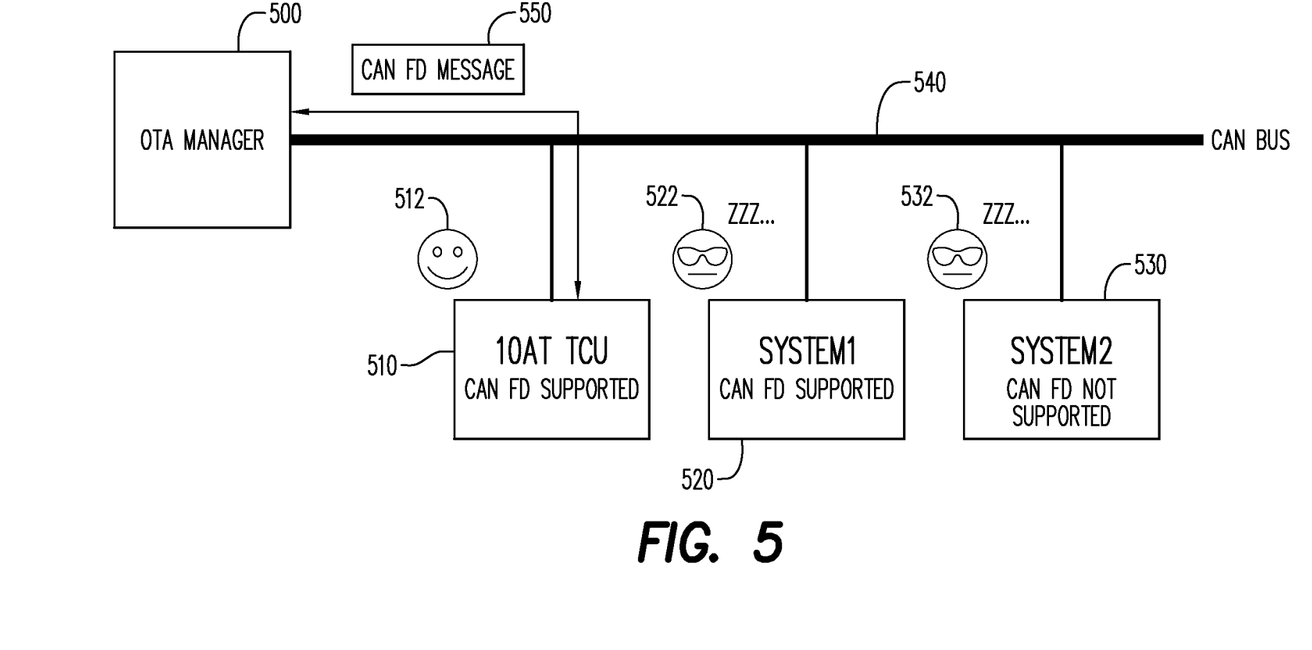
FIG. 5 is a diagram of an OTA manager used when reprogramming systems of a vehicle, when an ignition of a vehicle is off, in accordance with aspects of the present disclosure.

FIG. 5 is a diagram of an OTA manager when reprogramming systems of a vehicle, when an ignition of a vehicle is off, in accordance with aspects of the present disclosure. Aspects of FIG. 5 are somewhat similar to those of FIGS. 3-4. For example, FIG. 5 includes OTA manager 500, which attempts to reprogram the 10AT TCU 510 using a CAN FD message 550 sent along a CAN bus 540. For example, the OTA manager 500 may attempt to reprogram a 10AT TCU 510 using a CAN FD message 550. However, because the vehicle ignition is off in FIG. 5, system1 520 and system2 530 are kept in a sleep state, as shown in FIG. 5 at indicator 522 and indicator 532.

In FIG. 5, only the 10AT TCU 510 is reprogrammed, and it is reprogrammed successfully, as shown in FIG. 5 at indicator 512. As discussed above, while 10AT TCU 510 and system1 520 support CAN FD messages, system2 530 does not support CAN FD messages. However, no error occurs because the OTA manager 500 does not even attempt to operate system1 520 or system2 530, but instead only reprograms the 10AT TCU 510, doing so successfully using the CAN FD message 550 to achieve the higher data rates which are helpful for successful reprogramming.

FIG. 6 is a diagram of information interchange, in accordance with aspects of the present disclosure. Specifically, it may be necessary to reprogram an ECU, such as a TCU. Thus, an original equipment manufacturer (OEM) 610 may initiate an OTA reprogramming request. Such an OTA reprogramming request may be sent via a cloud server or the Internet 620 to service center 630, but it will be recognized that other wired and wireless transmission means may allow communication between OEM 610 and service center 630. Service center 630 provides the reprogramming information to car 640.

However, FIG. 6 is only one example architecture and other examples are possible. For example, other sources of information than an OEM 610 may act as the source of the reprogramming information. Additionally, the OEM 610 may send the OTA reprogramming request directly to car 640 for receipt, or may involve another intermediate device instead of service center 630. Based on the interaction between OEM 610, internet 620, service center 630, and car 640, it is possible to reprogram systems in car 640.

Figure 7:
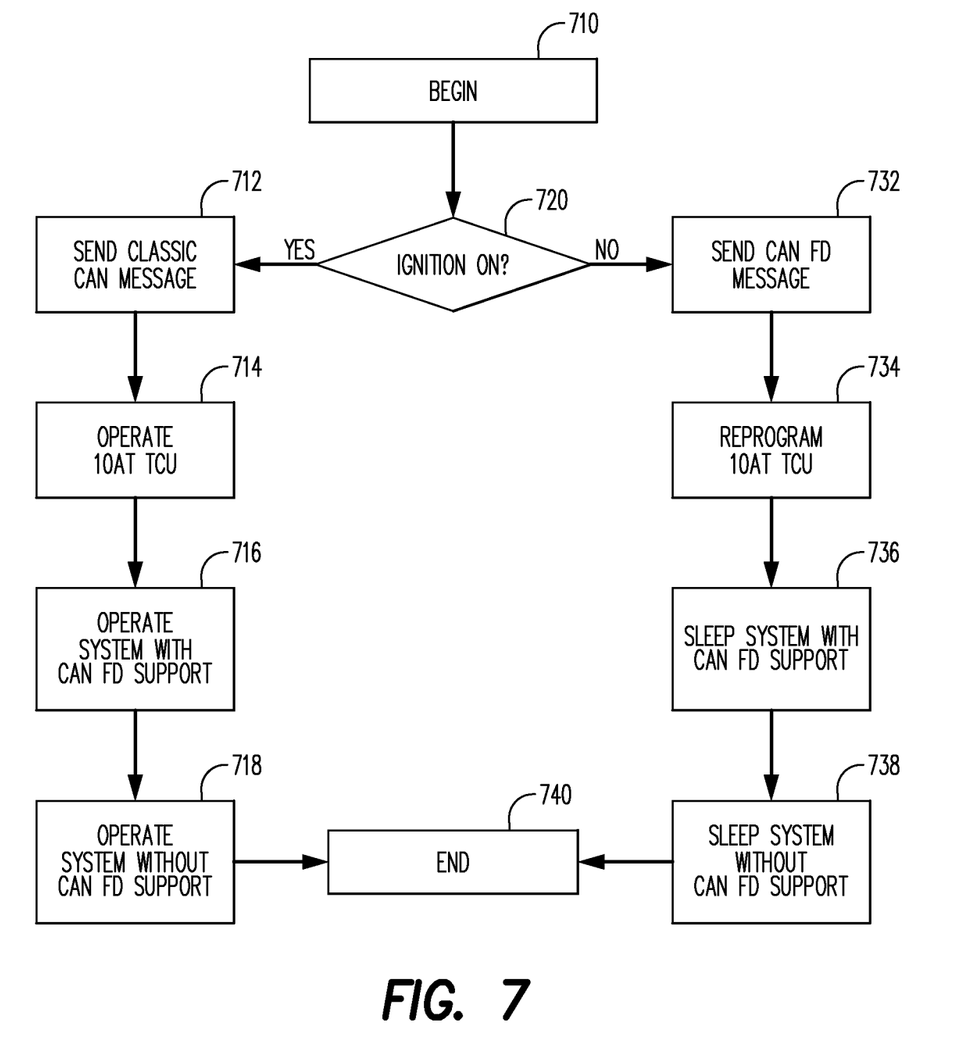
FIG. 7 is a flowchart of OTA management, in accordance with aspects of the present disclosure.

FIG. 7 is a flowchart of OTA management, in accordance with aspects of the present disclosure.

At operation 710, a method begins, where a vehicle determines whether to operate the vehicle normally or carry out OTA reprogramming of a system of the vehicle, such as a 10AT, based on whether the vehicle ignition is on. Such OTA reprogramming, as discussed above, may involve various aspects of making changes to the software of embedded systems of the vehicle. As discussed above, some of the embedded systems may support CAN FD, and some may not. It is desirable to use CAN FD protocols for OTA reprogramming because, as discussed above, CAN FD protocols are faster and classical CAN protocols may not be fast enough in some situations when performing OTA reprogramming.

At operation 720, the method determines whether a vehicle ignition is on. If so, the method continues to operation 712. If not the method continues to operation 732. This determination is made because certain approaches are taken based on whether the vehicle ignition is on or off.

When the vehicle ignition is on, it is required that all systems operate successfully, so the method uses a classic CAN message. Even though this approach is slower, it guarantees that all needed systems will operate. When the ignition is off, it is acceptable for the only reprogramming be that of a 10AT TCU that supports CAN FD. In such an approach, the other systems can sleep through the reprogramming process, and it does not matter if the message is a CAN FD message, in that no error will occur with the routine operation of the other systems. However, because the message is a CAN FD message, when reprogramming the 10AT TCU, it will be a faster reprogramming, as discussed further, below.

At operation 712, the method has determined that a vehicle has an ignition that is on. Here, the method sends a classic CAN message. As discussed above, because all of the systems of the vehicle support classic CAN, it is possible to operate all systems of the vehicle, regardless of whether the systems support CAN FD.

At operation 714, the method operates a 10AT TCU of the vehicle. This operation is performed using a classic CAN message, as sent in operation 712. While this operation may not provide the advantages of a CAN FD message, it ensures that all systems of the vehicle can be operated when the ignition is on.

At operation 716, the method operates a system with CAN FD support of the vehicle. For example, such a system may be another ECU, as discussed in greater detail, above. This operation is performed using a classic CAN message, as sent in operation 712. While this operation may not provide the advantages of a CAN FD message, it ensures that all systems of the vehicle can be operated when the ignition is on.

At operation 718, the method operates a system without CAN FD support. For example, such a system may be another ECU, as discussed in greater detail, above. This operation is performed using a classic CAN message, as sent in operation 712. While this operation may not provide the advantages of a CAN FD message, it ensures that all systems of the vehicle can be reprogrammed when the ignition is on. It is operation 718 that necessitates the use of the classic CAN message, in that if the operation were done with a CAN FD message, the system without CAN FD support would cause an error, potentially interfering with the normal operation of the vehicle while the ignition is on. Thus, the value of making sure that all systems of the vehicle can be operated while the ignition is on outweighs the slower speed of a classic CAN message.

After operation 718, the method has completed the requisite operation, and reaches operation 740, at which point the method ends. However, this only represents one cycle of operation, and the method shown in FIG. 7 may occur multiple times, as the vehicle ignition is turned on and off.

At operation 732, the method has determined that a vehicle ignition is off. Here, the method sends a CAN FD message. It is possible to send such a CAN FD message because only the 10AT TCU, which is known to support the CAN FD protocols, is to be reprogrammed.

At operation 734, the method reprograms a 10AT TCU of the vehicle. However, because the method has established that the vehicle ignition is off, the method is able to reprogram the 10AT TCU using the CAN FD message. Because the reprogramming uses a CAN FD protocol, it can achieve the advantages of CAN FD, such as a higher data transfer speed. Thus, while it is necessary to postpone using CAN FD until the vehicle ignition is off, when the vehicle ignition is off, the reprogramming may be performed to satisfy the time requirements that demand the use of CAN FD (that is, time requirements such that classic CAN does not transmit data quickly enough), without concern for errors due to incompatibility.

At operation 736, the method sleeps a system with CAN FD support of the vehicle. The method intends to use CAN FD messages for the reprogramming of the 10AT TCU of the vehicle. While the system of operation 736 would support the CAN FD message, the method does not rely on systems other than 10AT TCU of the vehicle being able to support CAN FD. Thus, the system of operation 736 sleeps, and it can be reprogrammed during a time when the vehicle ignition is on, using a classic CAN message.

The embodiment of FIG. 7 assumes that, at operation 736, the system that supports a CAN FD message does not require the accelerated speeds of CAN FD when it is reprogrammed. While FIG. 7 shows that only the 10AT TCU is guaranteed to have CAN FD support and only the 10AT TCU is reprogrammed when the ignition is off, in other embodiments it is possible that other systems that support CAN FD may be reprogrammed along with or instead of 10AT TCU when the vehicle ignition is off.

While an aspect of embodiments is ensuring that no systems that cannot support CAN FD messages receive such messages and cause errors, variations are possible in which other systems that are able to support CAN FD messages are reprogrammed along with the 10AT TCU when an ignition is off.

At operation 738, the method sleeps a system without CAN FD support of the vehicle. This operation 738 occurs because it provides a way to take advantage of the benefits of CAN FD while avoiding the errors that would occur if a CAN FD message was sent to a system that only supports classic CAN operation.

After operation 738, the method has competed the requisite reprogramming, and reaches operation 740, at which point the method ends. However, this only represents one cycle of reprogramming, and the method shown in FIG. 7 may occur multiple times, as the vehicle's ignition is turned on and off.

Thus, using the methods and systems discussed herein may provide certain advantageous features. The methods and systems provide the ability to ensure that system operation while a vehicle ignition is on will always occur successfully even if some systems do not support CAN FD protocols. The methods and systems also permit reprogramming of a TCU such as a 10AT TCU that supports CAN FD protocols more quickly when an ignition is off. It is appropriate to wait until the ignition is off to reprogram the 10AT TCU by itself while leaving other systems in a sleep state, avoiding any incompatibilities.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method of over the air (OTA) reprogramming of systems of a vehicle performed by an OTA reprogramming device, the method comprising:
    determining whether a vehicle ignition is on or off;
    while the vehicle ignition is on, using only classic controller area network (CAN) messages to operate one or more systems of the vehicle, including:
        sending a classic CAN message comprising information to operate a transmission control unit (TCU), and
        using the classic CAN message to operate the TCU; and
    while the vehicle ignition is off, using only CAN flexible-data (FD) messages to reprogram the one or more systems of the vehicle, including:
        sending a CAN FD message comprising information to reprogram the TCU, and
        reprogramming the TCU by using the CAN FD message.

2. The method of claim 1, wherein the one or more systems of the vehicle further comprise a first system with classic CAN support and with CAN FD support and a second system with classic CAN support and without CAN FD support.

3. The method of claim 2, in response to the determining that the vehicle ignition is on, the method further comprises operating the first system and the second system using the classic CAN message.

4. The method of claim 2, wherein in response to the determining that the vehicle ignition is off, the method further comprises placing the first system and the second system into a sleep state.

5. The method of claim 1 further comprising sending the CAN FD message comprising the information to reprogram the TCU across a CAN bus.

6. The method of claim 1 further comprising detecting the vehicle ignition is turned from on to off,
    in response to the detecting the vehicle ignition is turned from on to off, sending the CAN FD message comprising the information to reprogram the TCU, and
    using the CAN FD message to reprogram the TCU.

7. The method of claim 1, wherein the TCU is a ten-speed automatic (10 AT) TCU.

8. An over the air (OTA) operation method, the method comprising:
    receiving an OTA request from an original equipment manager (OEM); and
    sending a controller area network (CAN) message based on the received OTA request across a CAN bus to one or more systems of a vehicle,
    wherein while a vehicle ignition is on, only classic CAN messages are used to operate the one or more systems of the vehicle, and wherein the CAN message is a classic CAN message for operating a transmission control unit (TCU) connected to the CAN bus;
    wherein while the vehicle ignition is off, only CAN flexible-data (FD) messages are used to reprogram the one or more systems of the vehicle, and wherein the CAN message is a CAN FD message for reprogramming the TCU connected to the CAN bus; and
    reprogramming the TCU by using the CAN FD message.

9. The method of claim 8, wherein the TCU is a ten-speed automatic (10 AT) TCU.

10. The method of claim 9, wherein while the vehicle has the vehicle ignition that is on, the 10 AT TCU operates using a classic CAN protocol; and
    wherein while the vehicle ignition is off, the 10 AT TCU performs the reprogramming using a CAN FD protocol.

11. The method of claim 8, wherein the one or more systems of the vehicle further comprise a first system with classic CAN support and with CAN FD support.

12. The method of claim 11, wherein while the vehicle ignition is on, the method further comprises operating the first system using the classic CAN message; and
    wherein while the vehicle ignition is off, the first system sleeps.

13. The method of claim 11, wherein the one or more systems of the vehicle further comprise a second system with classic CAN support and without CAN FD support.

14. The method of claim 13, wherein while the vehicle ignition is on, the method further comprises operating the second system using the classic CAN message; and
wherein while the vehicle ignition is off, the second system sleeps.

15. An over the air (OTA) reprogramming system of a vehicle, the OTA reprogramming system comprising:
an OTA manager configured to:
receive an OTA request from an original equipment manufacturer (OEM);
send a controller area network (CAN) message based on the received OTA request across a CAN bus to one or more systems of the vehicle,
wherein while a vehicle ignition is on, only classic CAN messages are used to operate the one or more systems of the vehicle, and the CAN message is a classic CAN message;
wherein while the vehicle ignition is off, only CAN flexible-data (FD) messages are used to reprogram the one or more systems of the vehicle, and wherein the CAN message is a CAN FD message; and
a transmission control unit (TCU) on the CAN bus configured to receive the CAN message and (i) use the classic CAN message to operate the TCU while the vehicle ignition is on, and (ii) use the CAN FD message to reprogram the TCU while the vehicle ignition is off; and
wherein the OTA manager is further configured to reprogram the TCU by using the CAN FD message.

16. The OTA reprogramming system of claim 15, wherein the one or more systems of the vehicle further comprise a first system that supports a classic CAN protocol and a CAN FD protocol, and
wherein while the vehicle ignition is on, the first system operates using the classic CAN protocol.

17. The OTA reprogramming system of claim 16, wherein the one or more systems of the vehicle further comprise a second system that supports the classic CAN protocol and does not support the CAN FD protocol, and
wherein when while the vehicle ignition is on, the second system operates using the classic CAN protocol.

18. The OTA reprogramming system of claim 15, wherein when the OTA manager receives the OTA request from the OEM via at least one of a cloud server and a service center.

19. The OTA reprogramming system of claim 18, wherein the one or more systems of the vehicle further comprise a first system that supports a classic CAN protocol and a CAN FD protocol and a second system that supports the classic CAN protocol and does not support the CAN FD protocol, and
wherein while the vehicle ignition is off, the first system and the second system sleep.

20. The OTA reprogramming system of claim 15, wherein the TCU is a ten-speed automatic (10 AT) TCU.

* * * * *